(12) United States Patent
Zheng et al.

(10) Patent No.: US 10,851,485 B2
(45) Date of Patent: Dec. 1, 2020

(54) MULTIFUNCTIONAL DYEING AND FINISHING KETTLE AND INDUSTRIALIZED SUPERCRITICAL $CO_2$ FLUID ANHYDROUS DYEING AND FINISHING APPARATUS WITH A SCALE OVER 1000 LITERS

(71) Applicant: DALIAN POLYTECHNIC UNIVERSITY, Liaoning (CN)

(72) Inventors: Laijiu Zheng, Liaoning (CN); Huanda Zheng, Liaoning (CN); Shihui Gao, Liaoning (CN); Jun Yan, Liaoning (CN); Juan Zhang, Liaoning (CN); Fang Ye, Liaoning (CN); Yitong Han, Liaoning (CN)

(73) Assignee: DALIAN POLYTECHNIC UNIVERSITY, Liaoning (CN)

( * ) Notice: Subject to any disclaimer, the term of this patent is extended or adjusted under 35 U.S.C. 154(b) by 204 days.

(21) Appl. No.: 15/779,054

(22) PCT Filed: Jan. 22, 2017

(86) PCT No.: PCT/CN2017/072036
§ 371 (c)(1),
(2) Date: May 24, 2018

(87) PCT Pub. No.: WO2018/090489
PCT Pub. Date: May 24, 2018

(65) Prior Publication Data
US 2018/0355536 A1    Dec. 13, 2018

(30) Foreign Application Priority Data
Nov. 21, 2016 (CN) .......................... 2016 1 1039405

(51) Int. Cl.
*D06B 9/02*     (2006.01)
*D06B 9/06*     (2006.01)
(Continued)

(52) U.S. Cl.
CPC ............... *D06B 9/02* (2013.01); *D06B 19/00* (2013.01); *D06B 23/00* (2013.01); *D06B 23/18* (2013.01);
(Continued)

(58) Field of Classification Search
CPC . D06B 9/02; D06B 9/06; D06B 19/00; D06B 2700/36; D06B 23/042;
(Continued)

(56) References Cited

U.S. PATENT DOCUMENTS

2003/0066139 A1* 4/2003 Go .......................... D06B 23/10
8/158
2004/0056380 A1   3/2004 Fukuzawa et al.
2016/0244902 A1* 8/2016 Tsai ..................... D06B 23/042

FOREIGN PATENT DOCUMENTS

CN          1693580 A      11/2005
CN       201033850 Y  *   3/2008  ............... D06B 5/18
(Continued)

OTHER PUBLICATIONS

CN105040325—Machine Translation (Year: 2015).*
CN201033850—Machine Translation (Year: 2008).*
CN105032697—Machine Translation (Year: 2015).*

*Primary Examiner* — Marc Lorenzi
(74) *Attorney, Agent, or Firm* — Novick, Kim & Lee, PLLC; Allen Xue (57) ABSTRACT

The present invention discloses a multifunctional dyeing and finishing kettle and a production-type supercritical $CO_2$ fluid anhydrous dyeing and finishing apparatus with a scale over 1000 liters. The production-type supercritical $CO_2$ fluid anhydrous dyeing and finishing apparatus mainly comprises a $CO_2$ low-temperature storage tank, a $CO_2$ supply storage tank, a low-temperature transfer pump, an ethylene glycol head tank, an ethylene glycol pump, a water cooling tower, a water pump, a refrigeration unit, a condenser, a heat (Continued)

exchanger, a heat transfer oil system, a heat transfer oil replenishment system, a precooler, a $CO_2$ boost pump, a dye kettle, a feeder, a multifunctional dyeing and finishing kettle, a $CO_2$ circulation pump, a cooler, a separation kettle, an adsorber and a recovery compressor, an on-line monitoring system and an automatic control system. The apparatus is capable of meeting single-color or multi-color dyeing and finishing production of a plurality of textiles.

9 Claims, 4 Drawing Sheets (51) Int. Cl.
*D06B 23/18* (2006.01)
*D06B 23/22* (2006.01)
*D06B 19/00* (2006.01)
*D06B 23/00* (2006.01)

(52) U.S. Cl.
CPC ............... *D06B 23/22* (2013.01); *D06B 9/06* (2013.01); *D06B 2700/36* (2013.01); *Y02P 70/62* (2015.11)

(58) Field of Classification Search
CPC ........ D06B 23/14; D06B 23/18; D06B 23/20; D06B 23/205; D06B 23/22; D06P 1/81; D06P 1/94
See application file for complete search history.

(56) References Cited

FOREIGN PATENT DOCUMENTS

| | | | |
|---|---|---|---|
| CN | 101413191 | A | 4/2009 |
| CN | 102776738 | A | 11/2012 |
| CN | 102776739 | A | 11/2012 |
| CN | 102776740 | A | 11/2012 |
| CN | 102787459 | A | 11/2012 |
| CN | 105032697 | A * | 11/2015 |
| CN | 105040325 | A | 11/2015 |
| CN | 105862292 | A | 8/2016 |
| CN | 101082157 | A | 12/2017 |

* cited by examiner

MULTIFUNCTIONAL DYEING AND FINISHING KETTLE AND INDUSTRIALIZED SUPERCRITICAL $CO_2$ FLUID ANHYDROUS DYEING AND FINISHING APPARATUS WITH A SCALE OVER 1000 LITERS

TECHNICAL FIELD

The present invention relates to a dyeing and finishing apparatus used in the textile industry, and in particular, a multifunctional dyeing and finishing kettle and an apparatus for realizing engineered anhydrous dyeing and finishing production with supercritical $CO_2$ fluid as a solvent.

BACKGROUND ART

With the widespread recognition of a low-carbon economic model and a low-carbon development concept in various countries in the world, the discharge of a large amount of wastewater has become the primary bottleneck in the textile printing and dyeing industry. China's textile industry is facing an extremely grim test of low carbon. According to incomplete statistics, the total amount of wastewater discharged by printing and dyeing enterprises in China reaches 3 to 4 million tons per day; COD (Chemical Oxygen Demand) and BOD (Biochemical Oxygen Demand) are as high as 2000-3000 mg/L; residual dyes, heavy metals, sulfur compounds and various non-biodegradable organic auxiliaries in wastewater are difficult to be treated by coagulation, filtration, adsorption and other methods, and therefore the wastewater discharged by printing and dyeing enterprises is one of hardest industrial wastewater to treat.

At the same time, in accordance with the statistics from China Printing and Dyeing Industry Association, it is shown that the annual water consumption of the printing and dyeing industry in China reaches 9.548 billion tons, the fresh water consumption takes the second place among various industries in the country, of which the printing and dyeing water accounts for 80%, and the total amount of printing and dyeing wastewater discharged is ranked sixth in the total emissions of various industrial departments across the country. The problems of strong dependence on water resources, high energy consumption and high emissions have seriously hampered the sustainable development of the textile printing and dyeing industry. In particular, "carbon tariff" implemented by developed countries have further exacerbated the impact on the textile printing and dyeing industry in China, which is at the low end of the textile supply chain. Therefore, as an important industry in the low-carbon development plan of China, the textile printing and dyeing industry must speed up its integration with the "low-carbon era". The implementation of clean production of the printing and dyeing process is the only way for the sustainable development of the whole industry. The development of a less-water, energy-saving and pollution-free dyeing technology has become an urgent demand at home and abroad.

In 1988, Professor E. Schollmeyer from Germany applied for the first time a patent for supercritical fluid dyeing and introduced the dyeing process where a fabric was penetrated with dye-containing supercritical fluid, thereby providing a new research idea for solving the problem of dyeing and finishing pollution. In 1996, North Carolina State University and Unifi Corporation cooperated to develop a polyester fiber supercritical dyeing apparatus and process. Since then, the research on the supercritical $CO_2$ fluid dyeing technology in the textile dyeing and finishing industry has caused widespread concern in the international science and technology circles. Germany, USA, Japan, Italy and other countries have carried out this technology research successively, which mainly use industrially discharged waste gas $CO_2$ to dissolve non-polar or low-polarity dyes in a supercritical state to dye a fiber material. Compared with the dyeing process with an aqueous medium, the supercritical $CO_2$ fluid dyeing process is anhydrous and has the following advantages: $CO_2$ is non-toxic, non-flammable and low in price; dyes and $CO_2$ can be recycled, without emission and pollution; the dyeing speed is fast and the dyeing rate is high.

At present, the supercritical $CO_2$ fluid dyeing technology as a clean dyeing technology has made phased research at home and abroad. The use of supercritical $CO_2$ fluid for single-color dyeing of textiles achieves a better dyeing effect. The supercritical $CO_2$ fluid dyeing technology for Dacron fiber has also entered the stage of industrialization. However, the existing supercritical fluid dyeing apparatus can only achieve a single-color dyeing effect during single dyeing production, rather than multi-color production in the single dyeing process; at the same time, there is still some $CO_2$ to be discharged at the end of dyeing. With the continuous increase of the scale of the dyeing apparatus, the amount of $CO_2$ gas discharged will increase correspondingly, which is not conducive to the low-consumption production of the supercritical fluid dyeing process.

SUMMARY OF THE INVENTION

The present invention provides an industrialized supercritical $CO_2$ fluid anhydrous dyeing and finishing apparatus with a scale over 1000 liters against the above-mentioned problems. By connecting two or more dyeing and finishing kettles in parallel in a set of supercritical $CO_2$ fluid dyeing and finishing apparatus, it is possible to simultaneously realize single-color or multi-color engineered production of the same or different textiles so as to solve the problems of single color and difficulty in color change of products dyed by the existing apparatus. Therefore, the engineered production of the supercritical $CO_2$ fluid dyeing is achieved really.

The present invention provides a multifunctional dyeing and finishing kettle, wherein an integrated dyeing and finishing system is arranged inside a kettle body; the integrated dyeing and finishing system comprises a dye finishing agent unit and a textile dyeing and finishing unit in sequence from bottom to top; a $CO_2$ fluid inlet is provided in the bottom of the dye finishing agent unit; a gas-solid separation membrane IV is provided on the top of the dye finishing agent unit; a fluid distribution tube is provided on a central axis of the textile dyeing and finishing unit; the bottom of the fluid distribution tube is communicated with the dye finishing agent unit; the textile dyeing and finishing unit and the fluid distribution tube are of a porous structure respectively and have apertures of 5 mm and 1 mm respectively; a magnetic driver is arranged inside the textile dyeing and finishing unit; a magnetic device matched with the magnetic driver is arranged outside the multifunctional dyeing and finishing kettle. The magnetic driver and the magnetic device arranged outside the multifunctional dyeing and finishing kettle can realize the positive and negative rotation of the integrated dyeing and finishing system under the action of an electromotor. In the meantime, the integrated dyeing and finishing system can also be connected with the $CO_2$ fluid inlet in the bottom of the multifunctional dyeing and finishing kettle in a sealing manner.

Further, in the above-mentioned technical solution, the dye finishing agent unit comprises a gas-solid separation membrane I, a gas-solid separation membrane II, a gas-solid separation membrane III and a gas-solid separation membrane IV in sequence from bottom to top; a dye unit is formed between the gas-solid separation membrane I and the gas-solid separation membrane II; a finishing agent unit is formed between the gas-solid separation membrane II and the gas-solid separation membrane III; a uniform mixing unit is formed between the gas-solid separation membrane III and the gas-solid separation membrane IV and can serve to uniformly mix a dye and a finishing agent, thereby ensuring the uniformity of the dyeing and finishing effect and further accomplishing the dyeing and finishing process.

Further, in the above-mentioned technical solution, the integrated dyeing and finishing system is provided with three rows of universal wheels in a circumferential direction to meet the demands of the multifunctional dyeing and finishing kettle on the longitudinal movement and the axial rotation. The integrated dyeing and finishing system can simultaneously realize single-color or multi-color dyeing and finishing production of the same or different textiles.

The $CO_2$ fluid inlet is of a detachable structure, is connected with a gas inlet of the multifunctional dyeing and finishing kettle by a sealing ring and is capable of rotating using a bearing. A magnetic rotator rotates through the magnetic device provided outside the multifunctional dyeing and finishing kettle under the action of an electromotor, thereby driving the integrated dyeing and finishing system to rotate. Meanwhile, the integrated dyeing and finishing system is distributed with three rows of universal wheels (six universal wheels in total) in an axial direction, which can meet the demands of the integrated dyeing and finishing system on the axial rotation in the movement and dyeing and finishing production during assembly and disassembly. In the meantime, the textile dyeing and finishing unit and the fluid distribution tube are of a porous structure respectively and have the apertures of 5 mm and 1 mm respectively.

The present invention further provides an industrialized supercritical $CO_2$ fluid anhydrous dyeing and finishing apparatus with a scale over 1000 liters, comprising more than two multifunctional dyeing and finishing kettles described above. The multifunctional dyeing and finishing kettles are divided into a vertical type structure and a horizontal type structure. The integrated dyeing and finishing system is provided inside the kettle body. The vertical type dyeing and finishing kettle is provided with a hydraulic quick-opening mechanism, and the integrated dyeing and finishing system is assembled or disassembled using an electric hoist. The horizontal type dyeing and finishing kettle is provided with a side-open hydraulic quick-opening mechanism, and the integrated dyeing and finishing system is assembled or disassembled using a support vehicle.

Further, in the above-mentioned technical solution, the dye kettle is connected with the feeder and can serve to add dyes or finishing agents timely in the dyeing and finishing production process, so as to solve the problem that the dye or auxiliaries in the dye kettle are likely to cure and cake. By adding different dyes or finishing agents, the color blending and multifunctional production demands can be met. The feeder is of a screw propulsion structure and comprises a screw propeller, a screw and a dye unit in sequence; the dye unit is a hollow vessel whose sidewall is of a porous structure with an aperture of 0.05 micron to 1 micron; an openable and closable door is arranged on the sidewall of the vessel; the end parts of the vessel are a front sealed end and a rear sealed end respectively; the front sealed end is connected with the screw; a hollow elastic cavity is provided outside the dye unit, connected with the dye kettle and goes deep into the dye kettle; the elastic cavity is provided with an opening.

The dyes or finishing agents can be placed in the dye unit. With the operation of the screw propeller, the dye unit moves along the elastic cavity and enters the dye kettle. After the dye unit enters the dye kettle in place, the supercritical $CO_2$ fluid enters the dye unit from the porous structure of the sidewall of the dye unit, makes the dyes or finishing agents in the dye unit dissolved, and then flows into the dye kettle.

Further, in the above-mentioned technical solution, the industrialized supercritical $CO_2$ fluid anhydrous dyeing and finishing apparatus with a scale over 1000 liters mainly comprises a $CO_2$ storage system, a refrigeration system, a heating system, a dyeing circulation system, a separation and recovery system, an on-line monitoring system, an automatic control system and a safety interlock system. The $CO_2$ storage system comprises a $CO_2$ transport vehicle, a low-temperature transfer pump, a $CO_2$ low-temperature storage tank and a $CO_2$ supply storage tank in sequence; the refrigeration system comprises an ethylene glycol head tank, an ethylene glycol pump, a water cooling tower, a water pump, a refrigeration unit and a condenser. The heating system comprises a heat exchanger, a heat transfer oil system and a heat transfer oil replenishment system; the dyeing circulation system comprises a precooler, a $CO_2$ boost pump, a dye kettle, a feeder, a multifunctional dyeing and finishing kettle and a $CO_2$ circulation pump; the separation and recovery system comprises a cooler, a separation kettle, a dehydration kettle, an adsorber and a recovery compressor, wherein the recovery compressor is provided between the multifunctional dyeing and finishing kettle and the $CO_2$ supply storage tank; the on-line monitoring system comprises a solvent tank and an ultra-high performance convergence chromatograph; the automatic control system comprises a control cabinet, an electromagnetic valve, a display instrument and an electronic computer; the safety interlock system is connected with the automatic control system and is capable of realizing interlock systems including pressure, temperature, flow, safety and the like and has the functions of overpressure sound and light alarm, automatic parking, cover-opening interlock by dropping the pressure to zero, and door-closing in-place interlock before pressure boosting.

Liquid $CO_2$ in the $CO_2$ transport vehicle flows into the low-temperature $CO_2$ storage tank through the low-temperature transfer pump, for the dyeing and finishing production. During the textile dyeing and finishing production, liquid $CO_2$ in the $CO_2$ low-temperature storage tank enters the $CO_2$ supply storage tank first, then flows through the precooler to be condensed, and is injected into the dyeing and finishing apparatus by the $CO_2$ boost pump to finish a pressure boosting process; the liquid $CO_2$ is heated by the heat exchanger, such that the liquid $CO_2$ enters a supercritical state; after entering the dye kettle, the supercritical $CO_2$ fluid makes the dye or finishing agent inside the dye kettle dissolved and then flows into the multifunctional dyeing and finishing kettle. Under the action of the circulation pump, the supercritical $CO_2$ fluid flows circularly between the dye kettle and the multifunctional dyeing and finishing kettle to continuously dissolve the dyes or finishing agents, thereby realizing the dyeing and finishing processing to textiles in the kettle body.

At the end of dyeing and finishing, the supercritical $CO_2$ fluid in which the dye or finishing agent is dissolved is cooled by the cooler first, and the unused dye or finishing agent is then effectively separated from $CO_2$ gas in the separation kettle; the $CO_2$ gas then flows through the adsorber to adsorb the dye or finishing agent which is not separated completely to obtain purified $CO_2$; the purified $CO_2$ gas is liquefied in the condenser and recovered to the $CO_2$ supply storage tank, for next production. In the separation and recovery process, after the dyeing and finishing kettle and the $CO_2$ supply storage tank have a pressure balance, the recovery compressor is started, and residual gas in the multifunctional dyeing and finishing kettle flows through the adsorber and the condenser in sequence so as to sufficiently recover gas to the $CO_2$ supply storage tank.

Further, in the above-mentioned technical solution, according to the industrialized supercritical $CO_2$ fluid anhydrous dyeing and finishing apparatus with a scale over 1000 liters, the cooler, the separation kettle and the adsorber constitute a multi-stage separation system. In the meantime, a multi-stage gradient adsorption separation device is provided in the separation kettle and is capable of realizing strong separation from the dyes or finishing agents and the production of clean $CO_2$ gas.

Further, in the above-mentioned technical solution, according to the industrialized supercritical $CO_2$ fluid anhydrous dyeing and finishing apparatus with a scale over 1000 liters, the dye kettle is connected with the feeder and can serve to add dyes or finishing agents timely in the dyeing and finishing production process, so as to solve the problem that the dyes or auxiliaries in the dye kettle are likely to cure and cake. By adding different dyes or finishing agents, the color blending and multifunctional production demands can be met.

Further, in the above-mentioned technical solution, the industrialized supercritical $CO_2$ fluid anhydrous dyeing and finishing apparatus with a scale over 1000 liters is provided with the on-line monitoring system, wherein $CO_2$ fluid in which the dyes are dissolved can enter the ultra-high performance convergence chromatograph through fine adjustment valves provided at two sides of the on-line monitoring system so as to timely monitor the dissolution of the dyes or finishing agents in the supercritical $CO_2$ fluid, thereby guiding dyeing and finishing production. At the end of dyeing, $CO_2$ in the separation and recovery system is introduced into the on-line monitoring system using the fine adjustment valves to timely monitor the separation and recovery states. If residual dyes are still contained in $CO_2$, $CO_2$ is enabled to flow into the cooler again and is separated again till meeting the process requirements.

Further, in the above-mentioned technical solution, according to the industrialized supercritical $CO_2$ fluid anhydrous dyeing and finishing apparatus with a scale over 1000 liters, the $CO_2$ storage system comprises a $CO_2$ low-temperature storage tank and a $CO_2$ supply storage tank, wherein clean $CO_2$ is stored in the $CO_2$ low-temperature storage tank. $CO_2$ recovered in the dyeing and finishing process is stored in the $CO_2$ supply storage tank, such that the possible pollution to the $CO_2$ low-temperature storage tank in the recovery process can be avoided to facilitate the color-changing production.

Further, in the above-mentioned technical solution, the industrialized supercritical $CO_2$ fluid anhydrous dyeing and finishing apparatus with a scale over 1000 liters is provided with the recovery compressor which can realize sufficient recovery of the residual $CO_2$ gas in the dyeing and finishing kettle and further increase the $CO_2$ utilization ratio.

Further, in the above-mentioned technical solution, the industrialized supercritical $CO_2$ fluid anhydrous dyeing and finishing apparatus with a scale over 1000 liters is provided with the low-temperature transfer pump which can directly transfer liquid $CO_2$ in the $CO_2$ transport vehicle into the $CO_2$ low-temperature storage tank, such that the existing filling method of heating and gasifying, followed by cooling and liquefying is changed, and the production energy consumption is further reduced.

Further, in the above-mentioned technical solution, the industrialized supercritical $CO_2$ fluid anhydrous dyeing and finishing apparatus with a scale over 1000 liters is provided with the dehydration kettle which can realize the adsorption of water or a cleaning agent in the kettle body, thereby avoiding the problem of dye caking caused by the presence of water in the system. In the meantime, the dehydration kettle is a double-cylinder dehydration kettle which can realize alternate dehydration, and the regeneration function of the dehydration kettle can be achieved using a heating device. By means of the addition of a molecular sieve, the adsorption to residual dyes can also be realized.

Compared with the prior art, the present invention has the following outstanding features:

(1) The multifunctional dyeing and finishing kettle and the dye kettle can be used to realize single-color or multi-color dyeing and finishing production of textiles, solve the problem of color change in the anhydrous dyeing production with the supercritical $CO_2$ fluid and realize the functional finishing production of the textiles.

(2) The dye kettle is provided with the feeder which can serve to add dyes or finishing agents timely in the dyeing and finishing production process, thereby meeting the requirements on color blending and multifunctional finishing.

(3) The on-line monitoring system can monitor a dye dissolution state in the dyeing and finishing process and the separation and recovery process, thereby guiding the dyeing and finishing production.

(4) Compared with the existing supercritical $CO_2$ fluid dyeing apparatus, the present invention has the outstanding features of energy conservation and emission reduction, and really realizes the engineered anhydrous dyeing production with the supercritical $CO_2$ fluid.

In drawings, reference numerals represent the following parts: 1—$CO_2$ transport vehicle; 2—low-temperature transfer pump; 3—ethylene glycol head tank; 4—water cooling tower; 5—water pump; 6—refrigeration unit; 7—ethylene glycol pump; 8—condenser; 9—$CO_2$ supply storage tank; 10—precooler; 11—$CO_2$ boost pump; 12—heat exchanger; 13—dye kettle; 14—feeder; 15—multifunctional dyeing and finishing kettle I; 16—multifunctional dyeing and finishing kettle II; 17—heat transfer oil replenishment system; 18—heat transfer oil system; 19—$CO_2$ circulation pump; 20—on-line monitoring system; 21—cooler; 22—separation kettle; 23—adsorber; 24—recovery compressor;

25—electric hoist; 26—CO₂ low-temperature storage tank; 27—support vehicle; 28—dehydration kettle I; 29—dehydration kettle II;

151—CO₂ fluid inlet; 152—magnetic rotator; 153—gas passageway; 154—gas-solid separation membrane I; 155—gas-solid separation membrane II; 156—dye unit; 157—gas-solid separation membrane III; 158—finishing agent unit; 159—gas-solid separation membrane IV; 1510—uniform mixing unit; 1511—fluid passageway; 1512—textile dyeing and finishing unit; 1513—dyeing and finishing system lifting ring; 1514—fluid distribution tube; 1515—universal wheel;

141—screw propeller; 142—screw; 143—front sealed end; 144—dye unit; 145—rear sealed end; 146—dye kettle; 147—elastic cavity.

DETAILED DESCRIPTION OF THE PREFERRED EMBODIMENTS

The specific embodiments of the present invention are described in detail below with reference to FIGS. 1-5.

Figure 3:
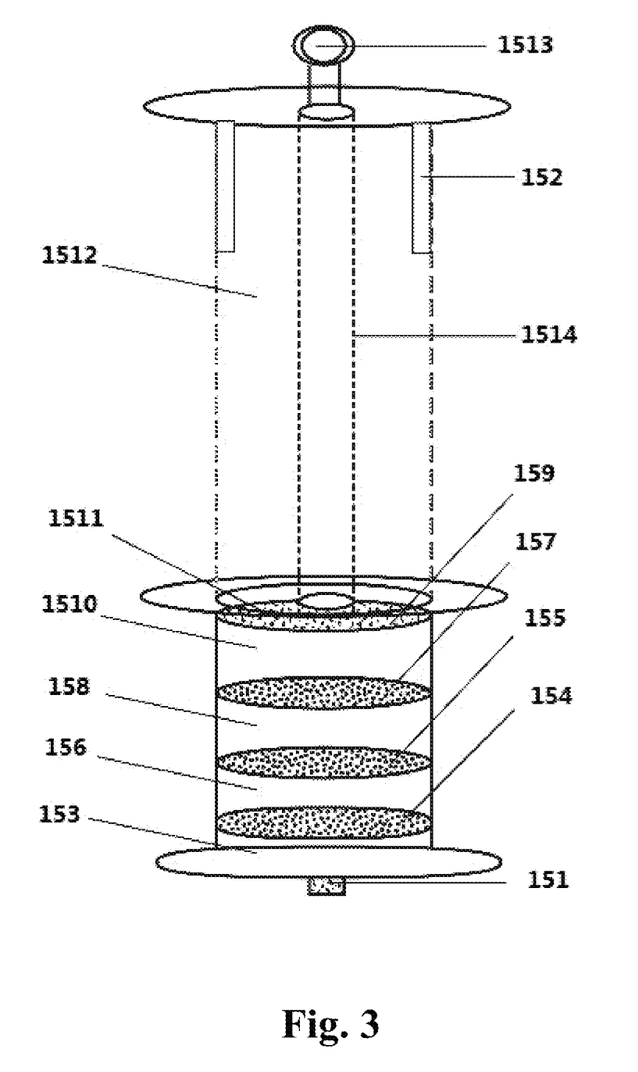
FIG. 3 is a schematic drawing of an integrated dyeing and finishing system in a multifunctional dyeing and finishing kettle.
Figure 4:
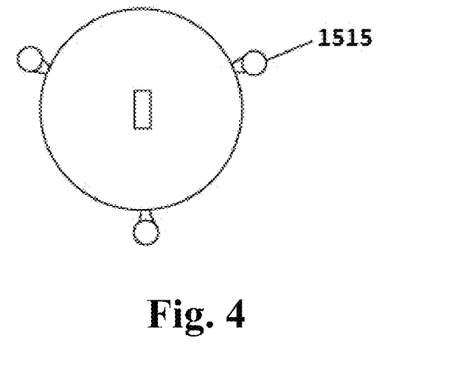
FIG. 4 is a top view of the integrated dyeing and finishing system in the multifunctional dyeing and finishing kettle.

As shown in FIG. 3 and FIG. 4, a dye finishing agent unit in each of the multifunctional dyeing and finishing kettle I 15 and the multifunctional dyeing and finishing kettle II 16 comprises a gas-solid separation membrane I 154, a gas-solid separation membrane II 155, a gas-solid separation membrane III 157 and a gas-solid separation membrane IV 159 in sequence from bottom to top. A dye unit 156 is formed between the gas-solid separation membrane I 154 and the gas-solid separation membrane II 155. A finishing agent unit 158 is formed between the gas-solid separation membrane II 155 and the gas-solid separation membrane III 157. A uniform mixing unit 1510 is formed between the gas-solid separation membrane III 157 and the gas-solid separation membrane IV 159.

Figure 5:
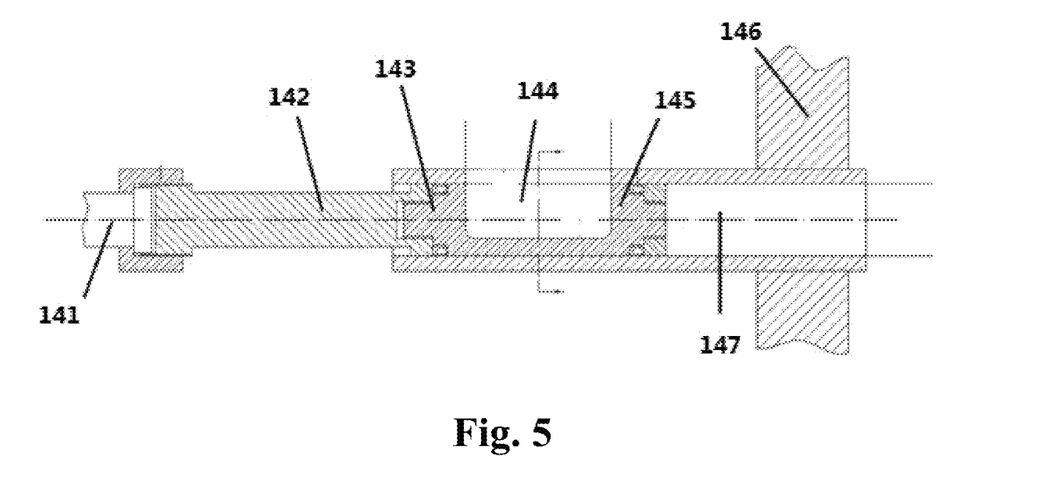
FIG. 5 is a structural schematic drawing of a feeder.

As shown in FIG. 5, a dye kettle 13 is connected with a feeder 14 and can serve to add dyes or finishing agents timely in the dyeing and finishing production process, so as to solve the problem that the dyes or auxiliaries in the dye kettle are likely to cure and cake. By adding different dyes or finishing agents, the color blending and multifunctional production demands can be met. The feeder is of a screw propulsion structure and comprises a screw propeller, a screw and a dye unit in sequence. The dye unit is a hollow vessel whose sidewall is of a porous structure with an aperture of 0.05 micron. An openable and closable door is arranged on the sidewall of the vessel. The end parts of the vessel are a front sealed end and a rear sealed end respectively. The front sealed end is connected with the screw. A hollow elastic cavity is provided outside the dye unit, connected with the dye kettle and goes deep into the dye kettle. The elastic cavity is provided with an opening.

The dyes or finishing agents can be placed in the dye unit. With the operation of the screw propeller, the dye unit moves along the elastic cavity and enters the dye kettle. After the dye unit enters the dye kettle in place, the supercritical CO₂ fluid enters the dye unit from the porous structure of the sidewall of the dye unit, makes the dye or finishing agents in the dye unit dissolved, and then flows into the dye kettle.

Example 1

Figure 1:
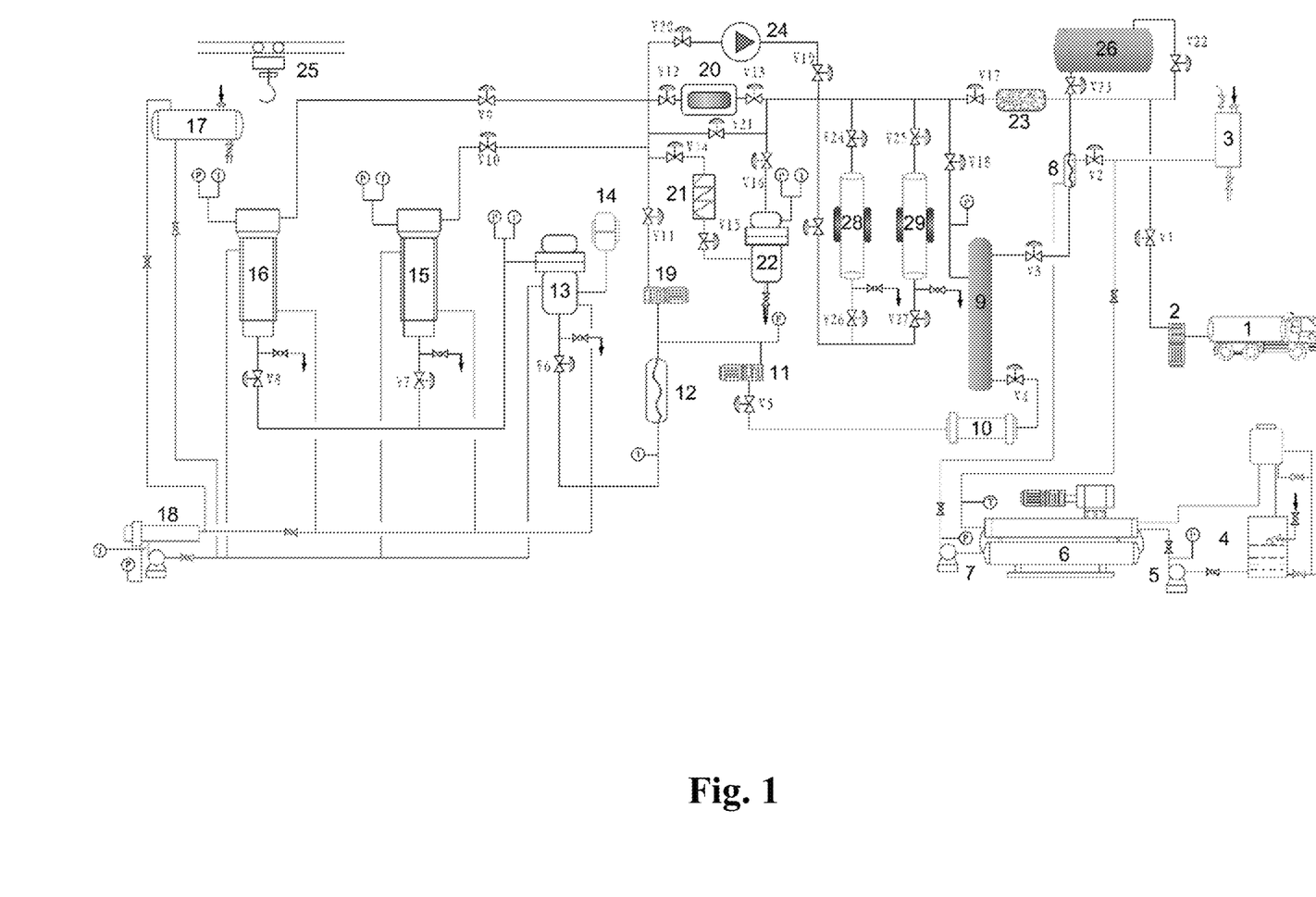
FIG. 1 is an schematic drawing of a vertical type industrialized supercritical $CO_2$ fluid anhydrous dyeing and finishing apparatus with a scale over 1000 liters.

As shown in FIG. 1, liquid CO₂ in a CO₂ transport vehicle 1 flows into a CO₂ low-temperature storage tank 26 through a low-temperature transfer pump 2 to perform a CO₂ inflation process. When the liquid level of CO₂ rises to ⅔, the inflation process is stopped for use of the dyeing and finishing production. Disperse red 153 is placed in the dye unit within the multifunctional dyeing and finishing kettle I 15, and disperse blue 148 is placed in the dye unit in the multifunctional dyeing and finishing kettle II 16, wherein an amount of the dyes accounts for 2% by weight of fabrics. 100 kg of Dacron fabrics are wound on a fluid distribution tube 1514 of a textile dyeing and finishing unit respectively, and an integrated dyeing and finishing system is loaded into the multifunctional dyeing and finishing kettle I 15 and the multifunctional dyeing and finishing kettle II 16 by means of an electric hoist 25. An automatic control system of a dyeing device is started, the multifunctional dyeing and finishing kettle I 15 and the multifunctional dyeing and finishing kettle II 16 are shut down, and a system self-check program is opened to ensure that a kettle body and an electromagnetic valve are located in a correct startup or shutdown state. After the system self-check is normal, a water cooling tower 4, a water pump 5 and an ethylene glycol pump 7 are started in sequence, and a refrigeration unit 6 and a heating system are then started. The liquid CO₂ in the CO₂ low-temperature storage tank 26 enters the CO₂ supply storage tank 9 first and then flows through a precooler 10 to be condensed and is injected into the dyeing and finishing apparatus by a CO₂ boost pump 11 to complete a pressure boosting process. Liquid CO₂ is heated by a heat exchanger 12, such that the liquid CO₂ enters a supercritical state. After entering the multifunctional dyeing and finishing kettle I 15 and the multifunctional dyeing and finishing kettle II 16, supercritical CO₂ flows through the dye finishing agent unit in the integrated dyeing and finishing system to make dyes dissolved and then enters the textile dyeing and finishing unit to dye the Dacron fabrics. After the temperature and pressure reach 140° C. and 24 MPa, the CO₂ boost pump 11 is closed. An electromotor connected with the multifunctional dyeing and finishing kettle I 15 and the multifunctional dyeing and finishing kettle II 16 is started, such that an outer magnetic lining sleeving the kettle body rotates to drive a magnetic rotator 152 provided in the integrated dyeing and finishing system to move, and therefore the in integrated dyeing and finishing system rotates forwards for 30 min at a speed of 50 r/min and then rotates reversely for 30 min at a speed of 50 r/min, to complete the dyeing of the Dacron fabrics with the dyes.

After the dyeing and finishing process is completed, a valve V14 is opened, CO₂ fluid containing unused dye flows through a cooler 21 first to be cooled to 30° C. and flows through a separation kettle 22 to realize deep separation with the unused dyes and CO₂ gas. The CO₂ gas is purified again in an adsorber 23 to obtain clean CO₂ gas, and the obtained clean CO₂ gas is liquefied by a condenser 8 and then recovered into the CO₂ low-temperature storage tank 26, for next dyeing production. After the multifunctional dyeing and finishing kettle I 15, the multifunctional dyeing and finishing kettle II 16 and the CO₂ low-temperature storage tank 26 reach a pressure balance, a recovery compressor 24 is started to continue the recovery of the CO₂ gas in the multifunctional dyeing and finishing kettle I 15 and the multifunctional dyeing and finishing kettle II 16. The clean CO₂ gas purified by the adsorber 23 is liquefied by the condenser 8 and then enters the CO₂ low-temperature storage tank 26. After the pressure in the multifunctional dyeing and finishing kettle I 15 and the multifunctional dyeing and finishing kettle II 16 is reduced to 0 MPa, the recovery compressor 24 is shut down. The multifunctional dyeing and finishing kettle I 15 and the multifunctional dyeing and finishing kettle II 16 are started to obtain the dyed Dacron fabrics.

After testing, the Dacron fabrics dyed with the disperse red 153 have a K/S value of 20.9, a standard deviation of the K/S value is less than 0.01, and therefore the Dacron fabrics have good leveling property and can meet the requirements of commercial dyeing. In the meantime, the dyed Dacron fabrics dyed with disperse red 153 have a color fastness level to washing of 5, a fastness level to dry grinding of 4-5, a fastness level to wet grinding of 4-5 and a color fastness level to sunlight of 6. The Dacron fabrics dyed with the disperse blue 148 have a K/S value of 17.5, a standard deviation of the K/S value is less than 0.02, and therefore the Dacron fabrics have good leveling property and can meet the requirements of commercial dyeing. In the meantime, the dyed Dacron fabrics dyed with the disperse blue 148 have a color fastness level to washing of 5, a fastness level to dry grinding of 5, a fastness level to wet grinding of 5 and a color fastness level to sunlight of 6.

Example 2

As shown in FIG. 1, liquid $CO_2$ in the $CO_2$ transport vehicle flows into the $CO_2$ low-temperature storage tank through a low-temperature transfer pump to perform a $CO_2$ inflation process. When the liquid level of $CO_2$ rises to ⅔, the inflation process is stopped for use of the dyeing and finishing production. Disperse orange 30 is placed in the dye kettle, wherein an amount of the dye accounts for 1% by weight of fabrics. 50 kg of Dacron cheese yarns sleeve the fluid distribution tube 1514 of the textile dyeing and finishing unit respectively, and the integrated dyeing and finishing system is loaded into the multifunctional dyeing and finishing kettle I 15 and the multifunctional dyeing and finishing kettle II 16 by means of an electric hoist. The automatic control system of the dyeing device is started, the multifunctional dyeing and finishing kettle I 15 and the multifunctional dyeing and finishing kettle II 16 are shut down, and a system self-check program is opened to ensure that the kettle body and the electromagnetic valve are located in a correct startup or shutdown state. After the system self-check is normal, the water cooling tower, the water pump and the ethylene glycol pump are started in sequence, and the refrigeration unit and the heating system are then started. The liquid $CO_2$ in the $CO_2$ low-temperature storage tank enters the $CO_2$ supply storage tank first and then flows through the precooler to be condensed and is injected into the dyeing and finishing apparatus by the $CO_2$ boost pump to complete a pressure boosting process. Liquid $CO_2$ is heated by the heat exchanger, such that the liquid $CO_2$ enters a supercritical state. The supercritical $CO_2$ enters the dye kettle to dissolve the dye, and the supercritical $CO_2$ fluid carried with the dye enters the multifunctional dyeing and finishing kettle. After the temperature and pressure reach 140° C. and 24 MPa, the $CO_2$ boost pump 11 is shut down, and a circulation pump is started to drive supercritical $CO_2$ fluid to continuously circulation between the dye kettle and the multifunctional dyeing and finishing kettle I 15 and the multifunctional dyeing and finishing kettle II 16, thereby realizing dyeing production of the Dacron cheese yarns. After 30 min of dyeing, the circulation pump is shut down, the valve V14 is opened, $CO_2$ fluid containing unused dye flows through the cooler first to be cooled to 30° C. and flows through the separation kettle to realize deep separation from the unused dye and $CO_2$ gas. The $CO_2$ gas is purified again in the adsorber to obtain clean $CO_2$ gas, and the obtained clean $CO_2$ gas is liquefied by the condenser and then recovered into the $CO_2$ low-temperature storage tank. After the multifunctional dyeing and finishing kettle I 15, the multifunctional dyeing and finishing kettle II 16 and the $CO_2$ low-temperature storage tank reach a pressure balance, the recovery compressor is started to continue the recovery of the $CO_2$ gas in the multifunctional dyeing and finishing kettle I 15 and the multifunctional dyeing and finishing kettle II 16. The clean $CO_2$ gas purified by the adsorber is liquefied by the condenser and then enters the $CO_2$ low-temperature storage tank, for next dyeing production. After the pressure in the multifunctional dyeing and finishing kettle I 15 and the multifunctional dyeing and finishing kettle II 16 is reduced to 0 MPa, the recovery compressor is shut down to accomplish the recovery process. The multifunctional dyeing and finishing kettle I 15 and the multifunctional dyeing and finishing kettle II 16 are started to obtain the dyed Dacron cheese yarns.

After testing, the Dacron cheese yarns dyed with the disperse orange 30 have a K/S value of 18.2, a standard deviation of the K/S value is less than 0.01, and therefore the Dacron cheese yarns have good leveling property and can meets the requirement of commercial dyeing. In the meantime, the dyed yarns have a color fastness level to washing of 5, a fastness level to dry grinding of 4-5, a fastness level to wet grinding of 4-5 and a color fastness level to sunlight of 6.

Example 3

Figure 2:
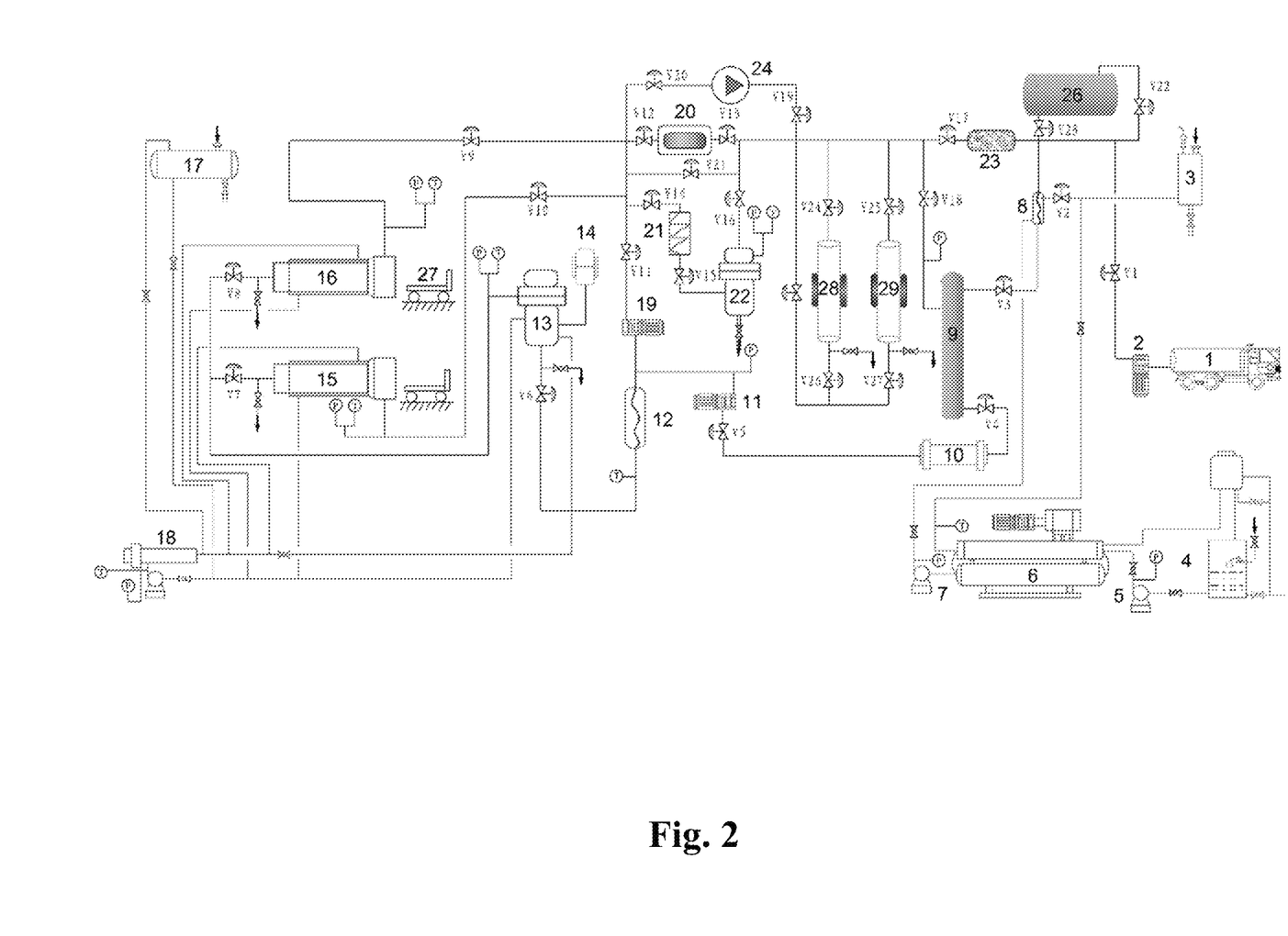
FIG. 2 is a schematic drawing of a horizontal type industrialized supercritical $CO_2$ fluid anhydrous dyeing and finishing apparatus with a scale over 1000 liters.

As shown in FIG. 2, disperse orange 30 is placed in the dye kettle, wherein an amount of the dye accounts for 0.5% by weight of fabrics. 100 kg of acrylic fabrics are wound on the textile dyeing and finishing unit respectively, and the integrated dyeing and finishing system is loaded into the dyeing and finishing kettle by means of a support vehicle. The automatic control system of the dyeing device is started, the multifunctional dyeing and finishing kettle I 15 and the multifunctional dyeing and finishing kettle II 16 are shut down, and a system self-check program is opened to ensure that the kettle body and the electromagnetic valve are located in a correct startup or shutdown state. After the system self-check is normal, the water cooling tower, the water pump and the ethylene glycol pump are started in sequence, and the refrigeration unit and the heating system are then started. $CO_2$ in the $CO_2$ supply storage tank flows through the precooler to be condensed and is injected into the dyeing and finishing apparatus by the $CO_2$ boost pump to complete a pressure boosting process. Liquid $CO_2$ is heated by the heat exchanger, such that the liquid $CO_2$ enters a supercritical state. The supercritical $CO_2$ enters the dye kettle to dissolve the dye, and the supercritical $CO_2$ fluid carried with the dye enters the multifunctional dyeing and finishing kettle I 15 and the multifunctional dyeing and finishing kettle II 16. After the temperature and pressure reach 100° C. and 22 MPa, the $CO_2$ boost pump is shut down, and the circulation pump is started to drive supercritical $CO_2$ fluid to continuously circulate between the dye kettle and the multifunctional dyeing and finishing kettle I 15 and the multifunctional dyeing and finishing kettle II 16, thereby realizing dyeing production of the acrylic cheese yarns. After 30 min of dyeing, 0.1% of anti-ultraviolet finishing agent 2-(2'-hydroxyl-3', 5'-di-tert-phenyl)-5-chlorobenzotriazole is added into the dye unit of the feeder and then added into the dye kettle. After 30 min of dyeing, the circulation pump is shut down, the valve V14 is opened, $CO_2$ fluid containing unused dye and finishing agent flows through the cooler first to be cooled to 30° C. and flows through the separation kettle to realize deep separation with the unused dyes and $CO_2$ gas. The $CO_2$ gas is purified again in the adsorber to obtain clean $CO_2$ gas, and the obtained clean $CO_2$ gas is liquefied by the condenser and then recovered into the $CO_2$ low-temperature storage tank. After the multifunctional dyeing and finishing kettle I 15, the multifunctional dyeing and finishing kettle II 16 and the $CO_2$ low-temperature storage tank reach a pressure balance, the recovery compressor is started to continue the recovery of the $CO_2$ gas in the multifunctional dyeing and finishing kettle I 15 and the multifunctional dyeing and finishing kettle II 16. The clean $CO_2$ gas purified by the adsorber is liquefied by the condenser and then enters the $CO_2$ low-temperature storage tank, for next dyeing and finishing production. After the pressure in the multifunctional dyeing and finishing kettle I 15 and the multifunctional dyeing and finishing kettle II 16 is reduced to 0 MPa, the recovery compressor is shut down to accomplish the recovery process. The multifunctional dyeing and finishing kettle I 15 and the multifunctional dyeing and finishing kettle II 16 are started to obtain the dyed Dacron fabrics.

After testing, the acrylic fabrics dyed with the disperse orange 30 have a K/S value of 15.9, a standard deviation of the K/S value is less than 0.02, and therefore the acrylic fabrics have good leveling property and can meet the requirement of commercial dyeing. In the meantime, the dyed yarns have a color fastness level to washing of 5, a fastness level to dry grinding of 4-5, a fastness level to wet grinding of 4-5 and a color fastness level to sunlight of 6. Moreover, the dyed fabrics finished with the anti-ultraviolet finishing agent 2-(2'-hydroxy-3', 5'-di-tert-phenyl)-5-chlorobenzotriazole have an ultraviolet shielding effect of over 98%.

Example 4

Liquid $CO_2$ in the $CO_2$ transport vehicle flows into the $CO_2$ low-temperature storage tank through the low-temperature transfer pump to perform a $CO_2$ inflation process. When the liquid level of $CO_2$ rises to ⅔, the inflation process is stopped for use of the dyeing and finishing production. Disperse red 60 is placed in the dye kettle, wherein an amount of the dye accounts for 1% by weight of fabrics. 200 kg of wool fabrics are wound on the textile dyeing and finishing unit respectively, and the integrated dyeing and finishing system is loaded into the dyeing and finishing kettle by means of the support vehicle. The automatic control system of the dyeing device is started, the multifunctional dyeing and finishing kettle I 15 and the multifunctional dyeing and finishing kettle II 16 are shut down, and a system self-check program is opened to ensure that the kettle body and the electromagnetic valve are located in a correct startup or shutdown state. After the system self-check is normal, the water cooling tower, the water pump and the ethylene glycol pump are started in sequence, and the refrigeration unit and the heating system are then started. $CO_2$ in the $CO_2$ supply storage tank flows through the precooler to be condensed and is injected into the dyeing and finishing apparatus by the $CO_2$ boost pump to complete a pressure boosting process. Liquid $CO_2$ is heated by the heat exchanger, such that the liquid $CO_2$ enters a supercritical state. The supercritical $CO_2$ enters the dye kettle to dissolve the dye, and the supercritical $CO_2$ fluid carried with the dye enters the multifunctional dyeing and finishing kettle I 15 and the multifunctional dyeing and finishing kettle II 16. After the temperature and pressure reach 100° C. and 22 MPa, the $CO_2$ boost pump is shut down, and a circulation pump is started to drive supercritical $CO_2$ fluid to continuously circulate between the dye kettle and the multifunctional dyeing and finishing kettle I 15 and the multifunctional dyeing and finishing kettle II 16, thereby realizing dyeing production of the wool fabrics. After 20 min of dyeing, 1% of disperse blue 79 is added into the dye unit of the feeder and then added into the dye kettle. After 40 min of dyeing, the circulation pump is shut down, the valve V14 is opened, $CO_2$ fluid containing unused dye and finishing agent flows through the cooler first to be cooled to 30° C. and flows through the separation kettle to realize deep separation from the unused dyes and $CO_2$ gas. The $CO_2$ gas is purified again in the adsorber to obtain clean $CO_2$ gas, and the obtained clean $CO_2$ gas is liquefied by the condenser and then recovered into the $CO_2$ low-temperature storage tank. After the multifunctional dyeing and finishing kettle I 15, the multifunctional dyeing and finishing kettle II 16 and the $CO_2$ low-temperature storage tank reach a pressure balance, the recovery compressor is started to continue the recovery of the $CO_2$ gas in the multifunctional dyeing and finishing kettle I 15 and the multifunctional dyeing and finishing kettle II 16. The clean $CO_2$ gas purified by the adsorber is liquefied by the condenser and then enters the $CO_2$ low-temperature storage tank, for next dyeing and finishing production. After the pressure in the multifunctional dyeing and finishing kettle I 15 and the multifunctional dyeing and finishing kettle II 16 is reduced to 0 MPa, the recovery compressor is shut down to accomplish the recovery process. The multifunctional dyeing and finishing kettle I 15 and the multifunctional dyeing and finishing kettle II 16 are started to obtain the dyed wool fabrics.

After testing, the obtained purple wool fabrics have a K/S value of 10.5, a standard deviation of the K/S value is less than 0.01, and therefore the wool fabrics have good leveling property and can meet the requirement of commercial dyeing. In the meantime, the dyed wool fabrics have a color fastness level to washing of 4, a fastness level to dry grinding of 4-5, a fastness level to wet grinding of 4-5 and a color fastness level to sunlight of 6.

Example 5

Liquid $CO_2$ in the $CO_2$ transport vehicle flows into the $CO_2$ low-temperature storage tank through the low-temperature transfer pump to perform a $CO_2$ inflation process. When the liquid level of $CO_2$ rises to ⅔, the inflation process is stopped for use of the dyeing and finishing production. Disperse red 153 is placed the multifunctional dyeing and finishing kettle I 15 and the multifunctional dyeing and finishing kettle II 16 and the dye units in the multifunctional dyeing and finishing kettle I 15 and the multifunctional dyeing and finishing kettle II 16, wherein an amount of the dye accounts for 2% by weight of fabrics. 100 kg of super-imitative cotton fabrics are wound on the textile dyeing and finishing unit respectively, and the integrated dyeing and finishing system is loaded into the dyeing and finishing kettle by means of the electric hoist. The automatic control system of the dyeing device is started, the multifunctional dyeing and finishing kettle I 15 and the multifunctional dyeing and finishing kettle II 16 are shut down, and a system self-check program is opened to ensure that the kettle body and the electromagnetic valve are located in a correct startup or shutdown state. After the system self-check is normal, the water cooling tower, the water pump and the ethylene glycol pump are started in sequence, and the refrigeration unit and the heating system are then started. The liquid $CO_2$ in the $CO_2$ low-temperature storage tank enters the $CO_2$ supply storage tank first and flows through the precooler to be condensed and is injected into the dyeing and finishing apparatus by the $CO_2$ boost pump to complete a pressure boosting process. Liquid $CO_2$ is heated by the heat exchanger, such that the liquid $CO_2$ enters a supercritical state. After entering the multifunctional dyeing and finishing kettle I 15 and the multifunctional dyeing and finishing kettle II 16, the supercritical $CO_2$ flows through the dye finishing agent unit in the integrated dyeing and finishing system to dissolve the dye and then enters the textile dyeing and finishing unit to dye the Dacron fabrics. After the temperature and pressure reach 130° C. and 26 MPa, the $CO_2$ boost pump is shut down. An electromotor connected with the multifunctional dyeing and finishing kettles is started, such that an outer magnetic lining sleeving the kettle body rotates to drive the magnetic rotator provided in the integrated dyeing and finishing system to move, and therefore, the integrated dyeing and finishing system rotates forwards for 30 min at a speed of 100 r/min and then rotates reversely for 30 min at a speed of 100 r/min, to complete the dyeing of the Dacron super-imitative cotton fabrics with the dye.

After the dyeing and finishing process is completed, the valve V14 is opened, $CO_2$ fluid containing unused dye flows through the cooler first to be cooled to 30° C. and flows through the separation kettle to realize deep separation from the unused dyes and $CO_2$ gas. The $CO_2$ gas is purified again in the adsorber to obtain clean $CO_2$ gas, and the obtained clean $CO_2$ gas is liquefied by the condenser and then recovered into the $CO_2$ low-temperature storage tank, for next dyeing production. After the multifunctional dyeing and finishing kettle I 15, the multifunctional dyeing and finishing kettle II 16 and the $CO_2$ low-temperature storage tank reach a pressure balance, the recovery compressor is started to continue the recovery of the $CO_2$ gas in the multifunctional dyeing and finishing kettle I 15 and the multifunctional dyeing and finishing kettle II 16. The clean $CO_2$ gas purified by the adsorber is liquefied by the condenser and then enters the $CO_2$ low-temperature storage tank. After the pressure in the multifunctional dyeing and finishing kettle I 15 and the multifunctional dyeing and finishing kettle II 16 is reduced to 0 MPa, the recovery compressor is shut down. The multifunctional dyeing and finishing kettle I 15 and the multifunctional dyeing and finishing kettle II 16 are started to obtain the dyed super-imitative cotton fabrics.

After testing, the dyed super-imitative cotton fabrics have a K/S value of 23.3, a standard deviation of the K/S value is less than 0.01, a standard deviation of a K/S value between the multifunctional dyeing and finishing kettle I 15 and the multifunctional dyeing and finishing kettle II 16 is less than 0.01 at the same time, and therefore the dyed super-imitative cotton fabrics have good leveling property and can meet the requirement of commercial dyeing. In the meantime, the dyed Dacron fabrics have a color fastness level to washing of 5, a fastness level to dry grinding of 5, a fastness level to wet grinding of 5 and a color fastness level to sunlight of 6.

Example 6

Disperse red 60 and disperse yellow 114 are placed the dye kettle in a ratio of 1:1, wherein an amount of the dyes accounts for 1% by weight of fabrics. 100 kg of super-imitative cotton fibers are placed on the textile dyeing and finishing unit, and the integrated dyeing and finishing system is loaded into the dyeing and finishing kettle by means of the support vehicle. The automatic control system of the dyeing device is started, the multifunctional dyeing and finishing kettle I 15 and the multifunctional dyeing and finishing kettle II 16 are shut down, and a system self-check program is opened to ensure that the kettle body and the electromagnetic valve are located in a correct startup or shutdown state. After the system self-check is normal, the water cooling tower, the water pump and the ethylene glycol pump are started in sequence, and the refrigeration unit and the heating system are then started. $CO_2$ in the $CO_2$ supply storage tank flows through the precooler to be condensed and is injected into the dyeing and finishing apparatus by the $CO_2$ boost pump to complete a pressure boosting process. Liquid $CO_2$ is heated by the heat exchanger, such that the liquid $CO_2$ enters a supercritical state. The supercritical $CO_2$ enters the dye kettle to dissolve the dyes. Then, the supercritical $CO_2$ fluid carried with the dyes enters the multifunctional dyeing and finishing kettle I 15 and the multifunctional dyeing and finishing kettle II 16. After the temperature and pressure reach 120° C. and 25 MPa, the $CO_2$ boost pump is shut down, and the circulation pump is started to drive supercritical $CO_2$ fluid to continuously circulate between the dye kettle and the multifunctional dyeing and finishing kettle I 15 and the multifunctional dyeing and finishing kettle II 16, thereby realizing dyeing production of the super-imitative cotton fibers. After 30 min of dyeing, 2% of polyethylene glycol diethylenetriamine is added into the dye unit of the feeder and then added into the dye kettle. The on-line monitoring system is started to monitor and determine a dissolution condition of the polyethylene glycol diethylenetriamine. After 60 min of dyeing, the circulation pump is shut down, the valve V14 is opened, $CO_2$ fluid containing unused dye and finishing agent flows through the cooler first to be cooled to 30° C. and flows through the separation kettle to realize deep separation from the unused dyes and $CO_2$ gas. The $CO_2$ gas is purified again in the adsorber to obtain clean $CO_2$ gas, and the obtained clean $CO_2$ gas is liquefied by the condenser and then recovered into the $CO_2$ low-temperature storage tank. After the multifunctional dyeing and finishing kettle I 15, the multifunctional dyeing and finishing kettle II 16 and the $CO_2$ low-temperature storage tank reach a pressure balance, the recovery compressor is started to continue the recovery of the $CO_2$ gas in the multifunctional dyeing and finishing kettle I 15 and the multifunctional dyeing and finishing kettle II 16. The clean $CO_2$ gas purified by the adsorber is liquefied by the condenser and then enters the $CO_2$ low-temperature storage tank, for next dyeing and finishing production. After the pressure in the multifunctional dyeing and finishing kettle I 15 and the multifunctional dyeing and finishing kettle II 16 is reduced to 0 MPa, the recovery compressor is shut down to accomplish the recovery process. The multifunctional dyeing and finishing kettle I 15 and the multifunctional dyeing and finishing kettle II 16 are started to obtain the dyed super-imitative cotton fibers.

After testing, the dyed orange super-imitative cotton fibers have a dyeing K/S value of 15.2, a standard deviation of a K/S value between the multifunctional dyeing and finishing kettle I 15 and the multifunctional dyeing and finishing kettle II 16 is less than 0.02, and therefore the dyed orange super-imitative cotton fibers have good leveling property and can meet the requirement of commercial dyeing. In the meantime, the dyed super-imitative cotton fibers have a color fastness level to washing of 5, a fastness level to dry grinding of 5, a fastness level to wet grinding of 5 and a color fastness level to sunlight of 6. In addition, the surface resistivity of the dyed fibers finished with the polyethylene glycol diethylenetriamine drops to $10^{10}\Omega$ or less, and the half-life period is less than 10 s.

Example 7

Liquid $CO_2$ in the $CO_2$ transport vehicle flows into the $CO_2$ low-temperature storage tank through the low-temperature transfer pump to perform a $CO_2$ inflation process. When the liquid level of $CO_2$ rises to ⅔, the inflation process is stopped for use of the dyeing and finishing production. Polyethylene glycol diethylenetriamine is placed in the dye kettle, wherein an amount of the polyethylene glycol diethylenetriamine accounts for 2% by weight of fabrics. 100 kg of Dacron fabrics are placed on the textile dyeing and finishing unit, and the integrated dyeing and finishing system is loaded into the dyeing and finishing kettle by means of the support vehicle. The automatic control system of the dyeing device is started, the multifunctional dyeing and finishing kettle I 15 and the multifunctional dyeing and finishing kettle II 16 are shut down, and a system self-check program is opened to ensure that the kettle body and the electromagnetic valve are located in a correct startup or shutdown state. After the system self-check is normal, the water cooling tower, the water pump and the ethylene glycol pump are started in sequence, and the refrigeration unit and the heating system are then started. $CO_2$ in the $CO_2$ supply storage tank flows through the precooler to be condensed and is injected into the dyeing and finishing apparatus by the $CO_2$ boost pump to complete a pressure boosting process. Liquid $CO_2$ is heated by the heat exchanger, such that the liquid $CO_2$ enters a supercritical state. The supercritical $CO_2$ enters the dye kettle to dissolve the dye, and the supercritical $CO_2$ fluid carried with the dye enters the multifunctional dyeing and finishing kettle I 15 and the multifunctional dyeing and finishing kettle II 16. After the temperature and pressure reach 140° C. and 25 MPa, the $CO_2$ boost pump is shut down, and the circulation pump is started to drive supercritical $CO_2$ fluid to continuously circulate between the dye kettle and the multifunctional dyeing and finishing kettle I 15 and the multifunctional dyeing and finishing kettle II 16, thereby realizing finishing production of the Dacron fabrics. After 60 min of finishing, the circulation pump is shut down and the valve V14 is opened. $CO_2$ fluid containing unused finishing agent flows through the cooler first to be cooled to 30° C. and flows through the separation kettle to realize deep separation from the unused finishing agent and $CO_2$ gas. The $CO_2$ gas is purified again in the adsorber to obtain clean $CO_2$ gas, and the obtained clean $CO_2$ gas is liquefied by the condenser and then recovered into the $CO_2$ low-temperature storage tank. After the multifunctional dyeing and finishing kettle I 15, the multifunctional dyeing and finishing kettle II 16 and the $CO_2$ low-temperature storage tank reach a pressure balance, the recovery compressor is started to continue the recovery of the $CO_2$ gas in the multifunctional dyeing and finishing kettle I 15 and the multifunctional dyeing and finishing kettle II 16. The clean $CO_2$ gas purified by the adsorber is liquefied by the condenser and then enters the $CO_2$ low-temperature storage tank, for next dyeing and finishing production. After the pressure in the multifunctional dyeing and finishing kettle I 15 and the multifunctional dyeing and finishing kettle II 16 is reduced to 0 MPa, the recovery compressor is shut down to accomplish the recovery process. The multifunctional dyeing and finishing kettle I 15 and the multifunctional dyeing and finishing kettle II 16 are started to obtain the Dacron fabrics with an anti-static effect.

After testing, the surface resistance of the Dacron fabrics finished with the polyethylene glycol diethylenetriamine drops to $10^{10}\Omega$ or less, and the half-life period is less than 10 s. In the meantime, a standard deviation of the half-life period of the Dacron fabrics and a standard deviation of a half-life period between the multifunctional dyeing and finishing kettle I 15 and the multifunctional dyeing and finishing kettle II 16 are less than 0.02 respectively, and therefore the Dacron fabrics can meet the requirement of commercial dyeing.

Example 8

Liquid $CO_2$ in the $CO_2$ transport vehicle flows into the $CO_2$ low-temperature storage tank through the low-temperature transfer pump to perform a $CO_2$ inflation process. When the liquid level of $CO_2$ rises to ⅔, the inflation process is stopped for use of the dyeing and finishing production. FRC-1 is placed in a finishing agent unit in the integrated dyeing and finishing system in the multifunctional dyeing and finishing kettle I 15 and the multifunctional dyeing and finishing kettle II 16, wherein an amount of the FRC-1 accounts for 2%. Chitosan is placed in the finishing agent unit in the integrated dyeing and finishing system in the multifunctional dyeing and finishing kettle I 15 and the multifunctional dyeing and finishing kettle II 16, wherein an amount of the chitosan accounts for 5% by weight of fabrics. 80 kg of cotton fabrics are placed on the textile dyeing and finishing unit, and the integrated dyeing and finishing system is loaded into the dyeing and finishing kettle by means of the support vehicle. The automatic control system of the dyeing device is started, the multifunctional dyeing and finishing kettle I 15 and the multifunctional dyeing and finishing kettle II 16 are shut down, and a system self-check program is opened to ensure that the kettle body and the electromagnetic valve are located in a correct startup or shutdown state. After the system self-check is normal, the water cooling tower, the water pump and the ethylene glycol pump are started in sequence, and the refrigeration unit and the heating system are then started. $CO_2$ in the $CO_2$ supply storage tank flows through the precooler to be condensed and is injected into the dyeing and finishing apparatus by the $CO_2$ boost pump to complete a pressure boosting process. Liquid $CO_2$ is heated by the heat exchanger, such that the Liquid $CO_2$ enters a supercritical state. After entering the multifunctional dyeing and finishing kettle I 15 and the multifunctional dyeing and finishing kettle II 16, the supercritical $CO_2$ flows through the dye finishing agent unit in the integrated dyeing and finishing system to dissolve the finishing agent and then enters the textile dyeing and finishing unit to finish the cotton fabrics. After the temperature and pressure reach 120° C. and 26 MPa, the $CO_2$ boost pump is shut down. An electromotor connected with the multifunctional dyeing and finishing kettles is started, such that an outer magnetic lining sleeving the kettle body rotates to drive the magnetic rotator provided in the integrated dyeing and finishing system to move, and therefore, the integrated dyeing and finishing system rotates forwards for 30 min at a speed of 50 r/min and then rotates reversely for 30 min at a speed of 50 r/min, to complete the finishing process of the Dacron fabrics.

After 60 min of finishing, the circulation pump is shut down and the valve V14 is opened. $CO_2$ fluid containing unused finishing agent flows through the cooler first to be cooled to 30° C. and flows through the separation kettle to realize deep separation from the unused finishing agent and $CO_2$ gas. The $CO_2$ gas enters a dehydration kettle I and a dehydration kettle II to remove water in the fabrics and the CO$_2$ gas. Later, the CO$_2$ gas is purified again in the adsorber to obtain clean CO$_2$ gas, and the obtained clean CO$_2$ gas is liquefied by the condenser and then recovered into the CO$_2$ low-temperature storage tank. After the multifunctional dyeing and finishing kettle I 15, the multifunctional dyeing and finishing kettle II 16 and the CO$_2$ low-temperature storage tank reach a pressure balance, the recovery compressor is started to continue the recovery of the CO$_2$ gas in the multifunctional dyeing and finishing kettle I 15 and the multifunctional dyeing and finishing kettle II 16. The clean CO$_2$ gas purified by the adsorber is liquefied by the condenser and then enters the CO$_2$ low-temperature storage tank, for next dyeing and finishing production. After the pressure in the multifunctional dyeing and finishing kettle I 15 and the multifunctional dyeing and finishing kettle II 16 is reduced to 0 MPa, the recovery compressor is shut down to accomplish the recovery process. The multifunctional dyeing and finishing kettle I 15 and the multifunctional dyeing and finishing kettle II 16 are started to obtain the cotton fabrics with flame retardant and antibacterial effects.

After testing, the cotton fabrics finished with the FRC-1 have a good flame retardant effect, the after flame time of 0s, the smoldering time of 0s, and the damage length of 77 mm. At the same time, the cotton fabrics finished with the chitosan have a good antibacterial capability against *Staphylococcus aureus* and *Escherichia coli*, with an antibacterial rate of zero. In addition, the recovery of the cotton fabrics is significantly improved.

The invention claimed is:

1. A multifunctional dyeing and finishing kettle, comprising:
   a kettle body having a top end and a bottom end, wherein the kettle body comprises a plurality of compartments;
   a plurality of gas-solid separation membranes arranged in the kettle body and divide the kettle body into the plurality of compartments;
   a magnetic driver affixed to the kettle body and configured to rotate in response to a magnetic device arranged outside the multifunctional dyeing and finishing kettle, wherein the rotation of the magnetic driver drives the kettle body to rotate,
   wherein a CO$_2$ fluid inlet is provided in the bottom end of the kettle body,
   wherein a fluid distribution tube is disposed along an axial direction of the kettle body, and
   wherein the fluid distribution tube is of a porous structure.

2. The multifunctional dyeing and finishing kettle according to claim 1,
   wherein the plurality of gas-solid membranes are gas-solid separation membrane I, gas-solid separation membrane II, gas-solid separation membrane III, and gas-solid separation membrane IV,
   wherein a first compartment is disposed between gas-solid separation membrane I and gas-solid separation membrane II, a second compartment is disposed between gas-solid separation membrane II and gas-solid separation membrane III, a third compartment is disposed between gas-solid separation membrane III and gas-solid separation membrane IV, and a fourth compartment is disposed between gas-solid separation membrane IV and a top end of the kettle body,
   wherein, during operation, a dye is placed in the first compartment, a dye finishing agent is placed in the second compartment, and a textile is placed in the fourth compartment, and
   a supercritical CO$_2$ fluid enters the kettle body through the CO$_2$ inlet, dissolves the dye in the first compartment, dissolves the dye finishing agent in the second compartment, passes through the third compartment, and fills the fourth compartment to dye the textile placed therein.

3. The multifunctional dyeing and finishing kettle according to claim 2, wherein the textile is wound on the fluid distribution tube.

4. The multifunctional dyeing and finishing kettle according to claim 1, wherein the fluid distribution tube has pores that are 1 mm in size.

5. An anhydrous dyeing and finishing apparatus, comprising at least one multifunctional dyeing and finishing kettle according to claim 1 fluidly connected with a CO$_2$ storage system.

6. The anhydrous dyeing and finishing apparatus according to claim 5, further comprising a feeder connected to the at least one multifunctional dyeing and finishing kettle, wherein the feeder comprises a screw propeller, a screw, a dye unit, and a hollow elastic cavity arranged in sequence,
   wherein the dye unit is a hollow vessel having a sidewall, a sealed front end, and a sealed rear end,
   wherein the sidewall has pores of 0.05 micron to 1 micron in size and an openable and closable door is arranged on the sidewall,
   wherein the sealed front end is connected with the screw, and
   wherein the hollow elastic cavity opens into the at least one multifunctional dyeing and finishing kettle.

7. The anhydrous dyeing and finishing apparatus according to claim 6, further comprising a CO$_2$ storage system, a refrigeration system, a heating system, a dyeing circulation system, a separation and recovery system, and an automatic control system,
   wherein the CO$_2$ storage system comprises a low-temperature transfer pump, a CO$_2$ low-temperature storage tank, and a CO$_2$ supply storage tank connected in sequence,
   wherein the refrigeration system comprises an ethylene glycol head tank, an ethylene glycol pump, a refrigeration unit, and a condenser,
   wherein the heating system comprises a heat exchanger,
   wherein the dyeing circulation system comprises a precooler, a CO$_2$ boost pump, a dye kettle, the feeder, the at least one multifunctional dyeing and finishing kettle, and a CO$_2$ circulation pump,
   wherein the separation and recovery system comprises a cooler, a separation kettle, a dehydration kettle, an adsorber, and a recovery compressor, wherein the recovery compressor is provided between the at least one multifunctional dyeing and finishing kettle and the CO$_2$ supply storage tank,
   wherein the automatic control system comprises a control cabinet, an electromagnetic valve, a display instrument and an electronic computer,
   wherein, during operation, the low-temperature transfer pump transfers liquid CO$_2$ from a source to the CO$_2$ low temperature storage tank, liquid CO$_2$ from the CO$_2$ low-temperature storage tank enters the CO$_2$ supply storage tank first, then flows through the precooler to be condensed, and is then injected into the dyeing and finishing apparatus by the CO$_2$ boost pump,
   wherein the liquid CO$_2$ is heated in the heat exchanger to reach a supercritical state, the supercritical CO$_2$ fluid from the heat exchanger enters the dye kettle and dissolves a dye or a finishing agent and then flows into the at least one multifunctional dyeing and finishing kettle to dye and finish a textile in the kettle body, wherein the supercritical $CO_2$ fluid from the at least one multifunctional dyeing and finishing kettle is cooled by the cooler and then enters the separation kettle in which a first portion of dye or finishing agent is separated from $CO_2$ gas, wherein the $CO_2$ gas from the separation kettle then flows through the adsorber to adsorb a second portion of dye or finishing agent that remains in the $CO_2$ gas to form a purified $CO_2$ gas, wherein the purified $CO_2$ gas is cooled and liquefied in the condenser and fed to the $CO_2$ supply storage tank, wherein, after the at least one multifunctional dyeing and finishing kettle and the $CO_2$ supply storage tank reaches a pressure balance, the recovery compressor is started, and a residual $CO_2$ gas flows through the adsorber and the condenser in sequence and enters the $CO_2$ supply storage tank.

8. The anhydrous dyeing and finishing apparatus according to claim 6, further comprising a monitoring system that contains a chromatograph configured to perform chromatography of the supercritical $CO_2$ fluid from the at least one multifunctional dyeing and finishing kettle.

9. The anhydrous dyeing and finishing apparatus according to claim 7, wherein the dehydration kettle is a double-cylinder dehydration kettle, and a heating device and a molecular sieve are arranged in the dehydration kettle.

\* \* \* \* \*